(12) United States Patent
Wheeler et al.

(10) Patent No.: US 10,614,682 B1
(45) Date of Patent: Apr. 7, 2020

(54) MOTION SENSING CABLE FOR TRACKING CUSTOMER INTERACTION WITH DEVICES

(71) Applicant: Mobile Tech, Inc., Lake Oswego, OR (US)

(72) Inventors: Wade Carter Wheeler, Portland, OR (US); Steven R. Payne, Hillsboro, OR (US)

(73) Assignee: MOBILE TECH, INC., Lake Oswego, OR (US)

( * ) Notice: Subject to any disclaimer, the term of this patent is extended or adjusted under 35 U.S.C. 154(b) by 0 days.

(21) Appl. No.: 16/257,841

(22) Filed: Jan. 25, 2019

Related U.S. Application Data

(60) Provisional application No. 62/796,188, filed on Jan. 24, 2019.

(51) Int. Cl.
| | |
|---|---|
| *H01F 7/06* | (2006.01) |
| *G08B 13/14* | (2006.01) |
| *H02J 7/00* | (2006.01) |
| *G01P 13/00* | (2006.01) |

(52) U.S. Cl.
CPC .......... *G08B 13/1445* (2013.01); *G01P 13/00* (2013.01); *H02J 7/0036* (2013.01); *H02J 7/0088* (2013.01)

(58) Field of Classification Search
CPC .... G08B 13/1445; G01P 13/00; H02J 7/0036; H02J 7/0088; H02J 7/007; G02J 7/0045; H01F 7/064; G01R 33/02
See application file for complete search history.

(56) References Cited

U.S. PATENT DOCUMENTS

| | | | |
|---|---|---|---|
| 883,335 | A | 3/1908 | O'Connor |
| 3,444,547 | A | 5/1969 | Surek |
| 3,612,462 | A | 10/1971 | Mooney et al. |
| 3,780,909 | A | 12/1973 | Callahan et al. |
| D244,857 | S | 6/1977 | Hayes |
| 4,075,878 | A | 2/1978 | Best |
| 4,117,465 | A | 9/1978 | Timblin |
| 4,335,931 | A | 6/1982 | Kinnear |
| 4,354,613 | A | 10/1982 | Desai et al. |
| 4,384,688 | A | 5/1983 | Smith |
| 4,590,337 | A | 5/1986 | Engelmore |
| 4,714,184 | A | 12/1987 | Young et al. |
| 4,772,878 | A | 9/1988 | Kane |

(Continued)

FOREIGN PATENT DOCUMENTS

| | | |
|---|---|---|
| AT | 506665 A1 | 10/2009 |
| CA | 2465692 A1 | 11/2004 |

(Continued)

OTHER PUBLICATIONS 35 mm Camera Display—Walmart Publication 1995.

(Continued)

*Primary Examiner* — An T Nguyen
(74) *Attorney, Agent, or Firm* — Thompson Coburn LLP

(57) ABSTRACT

An intelligent motion sensing cable is disclosed, where a motion sensor that is included in the cable can detect cable motion. The cable can use this detected motion to generate data indicative of customer interactions with a connected electronic device. The cable can also use this detected motion to intelligently control a charge signal delivered by the cable to a connected electronic device.

15 Claims, 11 Drawing Sheets

(56) References Cited

U.S. PATENT DOCUMENTS

| | | |
|---|---|---|
| 4,898,493 A | 2/1990 | Blankenburg |
| 5,033,709 A | 7/1991 | Yuen |
| 5,072,213 A | 12/1991 | Close |
| 5,146,205 A | 9/1992 | Keifer et al. |
| 5,176,465 A | 1/1993 | Holsted |
| 5,187,744 A | 2/1993 | Richter |
| 5,230,016 A | 7/1993 | Yasuda |
| 5,246,183 A | 9/1993 | Leyden |
| 5,436,792 A | 7/1995 | Leman et al. |
| 5,457,745 A | 10/1995 | Wang |
| 5,459,637 A | 10/1995 | Ma et al. |
| 5,517,434 A | 5/1996 | Hanson et al. |
| 5,543,782 A | 8/1996 | Rothbaum et al. |
| 5,552,771 A | 9/1996 | Leyden et al. |
| 5,570,267 A | 10/1996 | Ma |
| 5,586,022 A | 12/1996 | Arimoto et al. |
| 5,615,258 A | 3/1997 | Ho |
| 5,685,436 A | 11/1997 | Davet |
| 5,751,548 A | 5/1998 | Hall |
| 5,847,924 A | 12/1998 | Youn |
| 5,861,807 A | 1/1999 | Leyden et al. |
| D409,018 S | 5/1999 | Deuschle |
| 5,903,645 A | 5/1999 | Tsay |
| 5,923,528 A | 7/1999 | Lee |
| 5,982,855 A | 11/1999 | Miyamoto |
| 6,039,496 A | 3/2000 | Bishop |
| D433,953 S | 11/2000 | Woznicki et al. |
| 6,170,775 B1 | 1/2001 | Kovacik et al. |
| 6,236,435 B1 | 5/2001 | Gertz |
| D455,166 S | 4/2002 | Raad et al. |
| 6,380,855 B1 | 4/2002 | Ott |
| 6,386,906 B1 | 5/2002 | Burke |
| 6,400,560 B1 | 6/2002 | Chian |
| 6,476,717 B1 | 11/2002 | Gross et al. |
| 6,491,276 B1 | 12/2002 | Belliveau |
| 6,502,727 B1 | 1/2003 | Decoteau |
| 6,504,710 B2 | 1/2003 | Sutton et al. |
| 6,549,130 B1 | 4/2003 | Joao |
| 6,581,421 B2 | 6/2003 | Chmela et al. |
| 6,659,382 B2 | 12/2003 | Ryczek |
| 6,702,604 B1 | 3/2004 | Moscovitch |
| 6,714,983 B1 | 3/2004 | Koenck |
| 6,731,212 B2 | 5/2004 | Hirose et al. |
| 6,748,707 B1 | 6/2004 | Buchalter et al. |
| 6,761,579 B2 | 7/2004 | Fort et al. |
| 6,773,172 B1 | 8/2004 | Johnson et al. |
| 6,781,825 B2 | 8/2004 | Shih et al. |
| 6,786,766 B1 | 9/2004 | Chopra |
| 6,799,994 B2 | 10/2004 | Burke |
| 6,831,560 B2 | 12/2004 | Gresset |
| 6,856,506 B2 | 2/2005 | Doherty et al. |
| 6,885,817 B2 | 4/2005 | Artonne et al. |
| 6,896,543 B2 | 5/2005 | Fort et al. |
| D508,916 S | 8/2005 | Lee |
| 6,935,883 B2 | 8/2005 | Oddsen, Jr. |
| 6,944,294 B2 | 9/2005 | Tsay |
| 6,946,961 B2 | 9/2005 | Frederiksen et al. |
| 6,952,343 B2 | 10/2005 | Sato |
| 6,961,401 B1 | 11/2005 | Nally et al. |
| 7,002,467 B2 | 2/2006 | Deconinck et al. |
| 7,015,596 B2 | 3/2006 | Pail |
| 7,032,872 B2 | 4/2006 | Sullivan |
| 7,052,296 B2 | 5/2006 | Yang et al. |
| 7,053,774 B2 | 5/2006 | Sedon et al. |
| 7,068,496 B2 | 6/2006 | Wong et al. |
| 7,081,822 B2 | 7/2006 | Leyden et al. |
| 7,085,491 B2 | 8/2006 | Chiang |
| 7,101,187 B1 | 9/2006 | Deconinck et al. |
| 7,132,952 B2 | 11/2006 | Leyden et al. |
| 7,135,972 B2 | 11/2006 | Bonato |
| 7,154,039 B1 | 12/2006 | Marszalek et al. |
| 7,209,038 B1 | 4/2007 | Deconinck et al. |
| D545,826 S | 7/2007 | Richter |
| 7,287,652 B2 | 10/2007 | Scholen et al. |
| D563,444 S | 3/2008 | Brickzin |
| 7,352,567 B2 | 4/2008 | Hotelling et al. |
| 7,385,522 B2 | 6/2008 | Belden, Jr. et al. |
| 7,387,003 B2 | 6/2008 | Marszalek et al. |
| 7,446,659 B2 | 11/2008 | Marsilio et al. |
| 7,515,408 B2 | 4/2009 | Bakker et al. |
| 7,522,047 B2 | 4/2009 | Belden, Jr. et al. |
| 7,611,112 B2 | 11/2009 | Lin |
| 7,626,500 B2 | 12/2009 | Belden, Jr. et al. |
| 7,650,230 B1 | 1/2010 | Laverick et al. |
| 7,652,873 B2 | 1/2010 | Lee |
| 7,654,399 B2 | 2/2010 | Scholen et al. |
| 7,658,363 B2 | 2/2010 | Meyer |
| 7,667,601 B2 | 2/2010 | Rabinowitz et al. |
| 7,669,816 B2 | 3/2010 | Crain et al. |
| 7,684,185 B2 | 3/2010 | Farrugia |
| 7,688,205 B2 | 3/2010 | Ott |
| 7,696,857 B2 | 4/2010 | Kritt et al. |
| 7,710,266 B2 | 5/2010 | Belden, Jr. et al. |
| 7,712,661 B2 | 5/2010 | Thomas |
| 7,724,135 B2 | 5/2010 | Rapp et al. |
| 7,737,843 B2 | 6/2010 | Belden, Jr. et al. |
| 7,737,844 B2 | 6/2010 | Scott et al. |
| 7,737,845 B2 | 6/2010 | Fawcett et al. |
| 7,737,846 B2 | 6/2010 | Belden, Jr. et al. |
| 7,744,404 B1 | 6/2010 | Henson et al. |
| 7,848,833 B2 | 12/2010 | Chen et al. |
| 7,866,623 B2 | 1/2011 | Lampman et al. |
| 7,883,279 B2 | 2/2011 | Kendall |
| 7,909,641 B1 | 3/2011 | Henson et al. |
| D635,555 S | 4/2011 | Giles |
| D636,778 S | 4/2011 | Corsini et al. |
| D640,247 S | 6/2011 | Baumann et al. |
| 7,969,305 B2 | 6/2011 | Belden, Jr. et al. |
| D641,756 S | 7/2011 | Hsieh et al. |
| 7,971,845 B2 | 7/2011 | Galant |
| D643,056 S | 8/2011 | Zaliauskas et al. |
| 8,009,348 B2 | 8/2011 | Zehner et al. |
| D645,047 S | 9/2011 | Wike |
| D649,076 S | 11/2011 | Alexander |
| 8,102,262 B2 | 1/2012 | Irmscher et al. |
| D661,646 S | 6/2012 | Son |
| 8,208,245 B2 | 6/2012 | Staats |
| D663,972 S | 7/2012 | Alexander et al. |
| 8,251,325 B2 | 8/2012 | Molter |
| D668,660 S | 10/2012 | Norfolk |
| 8,282,060 B2 | 10/2012 | Fan |
| 8,289,131 B2 | 10/2012 | Cho et al. |
| D670,702 S | 11/2012 | Zhang et al. |
| D674,803 S | 1/2013 | Westrup |
| D678,293 S | 3/2013 | Meehan |
| D682,281 S | 5/2013 | Barnard et al. |
| 8,467,178 B2 | 6/2013 | Probst et al. |
| 8,497,753 B2 * | 7/2013 | DiFonzo ............ H01R 13/641 335/205 |
| D687,440 S | 8/2013 | Shieh |
| 8,499,384 B2 | 8/2013 | Zerhusen |
| 8,527,782 B2 * | 9/2013 | Griffin, Jr. ............ G06F 1/263 710/306 |
| 8,531,829 B2 | 9/2013 | Oberpriller et al. |
| 8,558,688 B2 | 10/2013 | Henson et al. |
| 8,573,394 B2 | 11/2013 | Ahee et al. |
| D696,259 S | 12/2013 | Howarth et al. |
| 8,611,086 B2 | 12/2013 | Magnusson et al. |
| 8,698,617 B2 | 4/2014 | Henson et al. |
| 8,698,618 B2 | 4/2014 | Henson et al. |
| D704,194 S | 5/2014 | Young |
| 8,749,194 B1 | 6/2014 | Kelsch et al. |
| 8,749,963 B2 | 6/2014 | Staats et al. |
| 8,780,548 B2 | 7/2014 | Lee |
| 8,800,763 B2 | 8/2014 | Hale |
| 8,800,942 B2 | 8/2014 | Yu |
| 8,814,128 B2 | 8/2014 | Trinh et al. |
| 8,844,972 B2 | 9/2014 | Riley et al. |
| 8,847,759 B2 | 9/2014 | Bisesti et al. |
| 8,851,565 B2 | 10/2014 | Hontz et al. |
| D717,804 S | 11/2014 | Budge |
| D718,316 S | 11/2014 | Veltz et al. |
| D719,144 S | 12/2014 | Eulette |
| 8,904,686 B2 | 12/2014 | Greer |

(56) References Cited

U.S. PATENT DOCUMENTS

| | | | |
|---|---|---|---|
| 8,913,380 B2 | 12/2014 | Enomoto et al. | |
| 8,955,807 B2 | 2/2015 | Alexander et al. | |
| 8,963,498 B2 | 2/2015 | Ferguson | |
| D725,119 S | 3/2015 | Gaylord | |
| D726,732 S | 4/2015 | Lay et al. | |
| 9,019,698 B2 | 4/2015 | Thiers | |
| D732,037 S | 6/2015 | Wylie | |
| 9,092,960 B2 | 7/2015 | Wheeler | |
| 9,097,380 B2 | 8/2015 | Wheeler | |
| 9,220,358 B2 | 12/2015 | Wheeler et al. | |
| 9,229,494 B2 | 1/2016 | Rayner | |
| D748,634 S | 2/2016 | Hofer et al. | |
| 9,269,247 B2 | 2/2016 | Fawcett et al. | |
| 9,303,809 B2 | 4/2016 | Reynolds et al. | |
| D757,731 S | 5/2016 | Nguyen et al. | |
| 9,373,236 B2 | 6/2016 | Oehl et al. | |
| 9,396,631 B2 | 7/2016 | Fawcett et al. | |
| D766,247 S | 9/2016 | Burmester | |
| 9,478,110 B2 | 10/2016 | Fawcett et al. | |
| 9,576,452 B2 | 2/2017 | Fawcett et al. | |
| 9,641,539 B1 | 5/2017 | Votaw et al. | |
| 9,659,472 B2 | 5/2017 | Fawcett et al. | |
| D795,263 S | 8/2017 | Fukioka et al. | |
| D798,302 S | 9/2017 | Burmester | |
| 9,786,140 B2 | 10/2017 | Henson et al. | |
| 9,847,806 B1 | 12/2017 | Dickie | |
| 9,858,777 B2 | 1/2018 | Dandie et al. | |
| 9,892,604 B2 | 2/2018 | Blaser et al. | |
| 9,978,232 B2 | 5/2018 | Weusten et al. | |
| 10,026,281 B2 | 7/2018 | Henson et al. | |
| 10,251,144 B2 | 4/2019 | Blaser et al. | |
| 2001/0049222 A1 | 12/2001 | Fort et al. | |
| 2001/0055978 A1 | 12/2001 | Herrod et al. | |
| 2002/0044406 A1 | 4/2002 | Shimoda et al. | |
| 2002/0085343 A1 | 7/2002 | Wu et al. | |
| 2002/0162366 A1 | 11/2002 | Chmela et al. | |
| 2003/0007634 A1 | 1/2003 | Wang | |
| 2003/0010859 A1 | 1/2003 | Ryczek | |
| 2003/0128975 A1 | 7/2003 | Shevick | |
| 2003/0137584 A1 | 7/2003 | Norvell et al. | |
| 2003/0222149 A1 | 12/2003 | Solomon et al. | |
| 2003/0222848 A1 | 12/2003 | Solomon et al. | |
| 2003/0235029 A1 | 12/2003 | Doherty et al. | |
| 2004/0003150 A1 | 1/2004 | Deguchi | |
| 2004/0007721 A1 | 1/2004 | Forbes et al. | |
| 2004/0017652 A1 | 1/2004 | Billington et al. | |
| 2004/0077210 A1 | 4/2004 | Kollmann | |
| 2004/0113819 A1 | 6/2004 | Gauthey et al. | |
| 2004/0195192 A1 | 10/2004 | Belokin et al. | |
| 2004/0201449 A1 | 10/2004 | Denison et al. | |
| 2004/0230725 A1 | 11/2004 | Chen et al. | |
| 2004/0233631 A1 | 11/2004 | Lord | |
| 2005/0040934 A1 | 2/2005 | Shanton | |
| 2005/0047104 A1 | 3/2005 | Grunow et al. | |
| 2005/0073413 A1 | 4/2005 | Sedon et al. | |
| 2005/0088572 A1 | 4/2005 | Pandit et al. | |
| 2005/0113036 A1 | 5/2005 | Lita | |
| 2005/0149723 A1 | 7/2005 | Watkins et al. | |
| 2005/0165806 A1 | 7/2005 | Roatis | |
| 2005/0206522 A1 | 9/2005 | Leyden et al. | |
| 2005/0255895 A1 | 11/2005 | Lee et al. | |
| 2006/0001541 A1 | 1/2006 | Leyden et al. | |
| 2006/0061958 A1 | 3/2006 | Solomon et al. | |
| 2006/0067036 A1 | 3/2006 | Lin et al. | |
| 2006/0148575 A1 | 7/2006 | Vitito | |
| 2007/0075914 A1 | 4/2007 | Bates | |
| 2007/0145210 A1 | 6/2007 | Fawcett et al. | |
| 2007/0152633 A1 | 7/2007 | Lee | |
| 2007/0159328 A1 | 7/2007 | Belden et al. | |
| 2007/0221726 A1 | 9/2007 | Thomas | |
| 2007/0229259 A1 | 10/2007 | Irmscher et al. | |
| 2007/0229529 A1 | 10/2007 | Sekine et al. | |
| 2007/0247793 A1 | 10/2007 | Carnevali | |
| 2008/0104301 A1 | 5/2008 | Assouad et al. | |
| 2008/0168806 A1 | 7/2008 | Belden et al. | |
| 2008/0169923 A1 | 7/2008 | Belden et al. | |
| 2008/0222849 A1 | 9/2008 | Lavoie | |
| 2008/0288702 A1 | 11/2008 | Diab et al. | |
| 2008/0300712 A1 | 12/2008 | Zachmann | |
| 2009/0007390 A1 | 1/2009 | Tsang et al. | |
| 2009/0033492 A1 | 2/2009 | Rapp et al. | |
| 2009/0034221 A1 | 2/2009 | Kerrigan | |
| 2009/0079566 A1 | 3/2009 | Goldstein et al. | |
| 2009/0080684 A1 | 3/2009 | Groset et al. | |
| 2009/0114556 A1 | 5/2009 | Tai et al. | |
| 2009/0134997 A1 | 5/2009 | Godlewski | |
| 2009/0153358 A1* | 6/2009 | Park | H01M 10/44 340/870.39 |
| 2009/0166483 A1 | 7/2009 | Marsilio et al. | |
| 2009/0173868 A1 | 7/2009 | Fawcett et al. | |
| 2009/0179127 A1 | 7/2009 | Pettey | |
| 2009/0183266 A1 | 7/2009 | Tan et al. | |
| 2009/0225166 A1 | 9/2009 | Dronge | |
| 2009/0303692 A1 | 12/2009 | Terlizzi | |
| 2009/0328141 A1 | 12/2009 | Zhang et al. | |
| 2010/0081337 A1 | 4/2010 | Dorogusker et al. | |
| 2010/0138581 A1 | 6/2010 | Bird et al. | |
| 2010/0146307 A1* | 6/2010 | Griffin, Jr. | G06F 1/263 713/300 |
| 2010/0172081 A1 | 7/2010 | Tian et al. | |
| 2010/0195279 A1 | 8/2010 | Michael | |
| 2010/0215355 A1 | 8/2010 | Olien | |
| 2010/0326934 A1 | 12/2010 | Goldberg | |
| 2011/0047844 A1 | 3/2011 | Fawcett et al. | |
| 2011/0068919 A1 | 3/2011 | Rapp et al. | |
| 2011/0114804 A1 | 5/2011 | Liu et al. | |
| 2011/0187531 A1 | 8/2011 | Oehl et al. | |
| 2011/0195786 A1 | 8/2011 | Wells | |
| 2011/0254661 A1 | 10/2011 | Fawcett et al. | |
| 2011/0278635 A1 | 11/2011 | Procter et al. | |
| 2011/0283754 A1 | 11/2011 | Ezzo et al. | |
| 2011/0303816 A1 | 12/2011 | Horvath et al. | |
| 2011/0309934 A1 | 12/2011 | Henson et al. | |
| 2012/0026119 A1 | 2/2012 | Judy et al. | |
| 2012/0033375 A1 | 2/2012 | Madonna et al. | |
| 2012/0037783 A1 | 2/2012 | Alexander et al. | |
| 2012/0043247 A1 | 2/2012 | Westrup | |
| 2012/0043451 A1 | 2/2012 | Alexander et al. | |
| 2012/0155004 A1 | 6/2012 | Yukawa et al. | |
| 2012/0175474 A1 | 7/2012 | Barnard et al. | |
| 2012/0182680 A1 | 7/2012 | Wetzel et al. | |
| 2012/0188689 A1 | 7/2012 | Leung et al. | |
| 2012/0189156 A1 | 7/2012 | Leung | |
| 2012/0193496 A1 | 8/2012 | Li | |
| 2012/0205326 A1 | 8/2012 | Richter et al. | |
| 2012/0217371 A1 | 8/2012 | Abdollahzadeh et al. | |
| 2012/0280810 A1 | 11/2012 | Wheeler | |
| 2012/0286118 A1 | 11/2012 | Richards | |
| 2012/0293330 A1 | 11/2012 | Grant et al. | |
| 2012/0293924 A1 | 11/2012 | Dolci et al. | |
| 2012/0303476 A1 | 11/2012 | Krzyzanowski | |
| 2013/0026322 A1 | 1/2013 | Wheeler et al. | |
| 2013/0026332 A1 | 1/2013 | Liu | |
| 2013/0043369 A1 | 2/2013 | Wheeler | |
| 2013/0058023 A1 | 3/2013 | Supran et al. | |
| 2013/0161054 A1 | 6/2013 | Allison et al. | |
| 2013/0168527 A1 | 7/2013 | Wheeler et al. | |
| 2013/0238516 A1 | 9/2013 | Moock et al. | |
| 2013/0268316 A1 | 10/2013 | Moock et al. | |
| 2013/0346661 A1 | 12/2013 | Hasenei | |
| 2014/0058023 A1 | 2/2014 | Wan et al. | |
| 2014/0111337 A1 | 4/2014 | Taylor et al. | |
| 2014/0118930 A1 | 5/2014 | Sedon et al. | |
| 2014/0159898 A1 | 6/2014 | Wheeler et al. | |
| 2014/0168884 A1 | 6/2014 | Wylie | |
| 2014/0321048 A1 | 10/2014 | Kupferstein | |
| 2014/0351098 A1 | 11/2014 | Shafer et al. | |
| 2014/0355200 A1 | 12/2014 | Thiers | |
| 2014/0380442 A1 | 12/2014 | Addepalli et al. | |
| 2015/0048625 A1 | 2/2015 | Weusten et al. | |
| 2015/0156900 A1 | 6/2015 | Yeh et al. | |
| 2015/0186685 A1 | 7/2015 | Vroom et al. | |
| 2015/0201723 A1 | 7/2015 | Rayner et al. | |
| 2015/0212590 A1 | 7/2015 | Feldstein et al. | |

(56) References Cited

U.S. PATENT DOCUMENTS

| | | |
|---|---|---|
| 2015/0235533 A1 | 8/2015 | Grant et al. |
| 2015/0319274 A1* | 11/2015 | McLoughlin .......... H04M 1/21 455/575.8 |
| 2015/0346824 A1* | 12/2015 | Chen .................... H04N 5/4403 345/156 |
| 2015/0348381 A1 | 12/2015 | Fawcett et al. |
| 2016/0042620 A1 | 2/2016 | Dandie et al. |
| 2016/0054469 A1 | 2/2016 | Li et al. |
| 2016/0055469 A1 | 2/2016 | Kim et al. |
| 2016/0105359 A1 | 4/2016 | Kim et al. |
| 2016/0135560 A1 | 5/2016 | Yeh |
| 2016/0239796 A1 | 8/2016 | Grant et al. |
| 2016/0266214 A1* | 9/2016 | Nomura ............. G01R 33/0023 |
| 2016/0307209 A1 | 10/2016 | Marszalek |
| 2016/0307415 A1 | 10/2016 | Marszalek et al. |
| 2016/0307416 A1 | 10/2016 | Marszalek et al. |
| 2016/0308952 A1 | 10/2016 | Marszalek et al. |
| 2016/0335859 A1 | 11/2016 | Sankey |
| 2016/0365185 A1* | 12/2016 | Bengtsson .............. H01F 7/064 |
| 2017/0032636 A1 | 2/2017 | Henson et al. |
| 2017/0116832 A1 | 4/2017 | Weusten et al. |
| 2017/0164314 A1 | 6/2017 | Wylie et al. |
| 2017/0193780 A1 | 7/2017 | Moock et al. |
| 2017/0222457 A1* | 8/2017 | Hijazi .................... G06F 1/263 |
| 2017/0295953 A1 | 10/2017 | Sakata et al. |
| 2017/0300721 A1 | 10/2017 | Blaser et al. |
| 2017/0303185 A1* | 10/2017 | Nathan ................. G08B 21/18 |
| 2018/0007648 A1 | 1/2018 | Wylie et al. |
| 2018/0025596 A1 | 1/2018 | Henson et al. |
| 2018/0035827 A1 | 2/2018 | Grant et al. |
| 2018/0049563 A1 | 2/2018 | Henson et al. |
| 2018/0077276 A1* | 3/2018 | Wright .............. H04M 1/72522 |
| 2018/0219396 A1* | 8/2018 | Lebovitz ............... H02J 7/0044 |
| 2018/0267074 A1* | 9/2018 | Keal ...................... G01P 21/00 |
| 2018/0288720 A1 | 10/2018 | Blaser et al. |
| 2018/0288721 A1 | 10/2018 | Blaser et al. |
| 2018/0288722 A1 | 10/2018 | Blaser et al. |

FOREIGN PATENT DOCUMENTS

| | | |
|---|---|---|
| CN | 103098104 | 5/2013 |
| DE | 202009013722 U1 | 1/2011 |
| EP | 0745747 A1 | 12/1996 |
| EP | 1575249 A2 | 9/2005 |
| EP | 2619737 | 7/2013 |
| ES | 1058183 U | 11/2004 |
| FR | 2595227 A1 | 9/1987 |
| FR | 2768906 A1 | 4/1999 |
| FR | 2868459 A1 | 10/2005 |
| GB | 2427056 A | 12/2006 |
| GB | 2440600 A | 2/2008 |
| JP | H0573857 U | 10/1993 |
| JP | H0668913 A | 3/1994 |
| JP | 1997-259368 | 10/1997 |
| JP | 3100287 B2 | 10/2000 |
| WO | 1997031347 A1 | 8/1997 |
| WO | 2004038670 A1 | 5/2004 |
| WO | 2009042905 A1 | 4/2009 |
| WO | 2012039794 A1 | 3/2012 |
| WO | 2012069816 A1 | 5/2012 |
| WO | 2012151130 A2 | 11/2012 |
| WO | 2013015855 A2 | 1/2013 |
| WO | 2013068036 A1 | 5/2013 |
| WO | 2013134484 A1 | 9/2013 |
| WO | 2014019072 A1 | 2/2014 |
| WO | 2014107184 A2 | 7/2014 |
| WO | 2014134718 A1 | 9/2014 |
| WO | 2015050710 A2 | 4/2015 |
| WO | 2015051840 A1 | 4/2015 |
| WO | 2015169373 | 11/2015 |
| WO | 2015184993 | 12/2015 |
| WO | 2016130762 | 8/2016 |
| WO | 2016179250 | 12/2019 |

OTHER PUBLICATIONS

"Fixed Display Solution for Apple HomePod", Invue, 2019, 1 page.
MTI 2008 PowerPoint, "Vanguard Program" (Exhibit 1005 of Declaration of Mike Cook), pp. 1-9.
"MTI Freedom Universal 2.0 Product Manual", Dec. 2008, pp. 1-21.
Office Action for U.S. Appl. No. 16/257,841, dated Apr. 19, 2019.
Propelinteractive, "Freedom Universal 2 Animation_003.wmv", YouTube Video https://www.youtube.com/watch?v=_odGNnQv0BQ &t=1s, published on Feb. 16, 2010 (see sample screenshots, pp. 1-24).
Propelinteractive, "Installing LP3 Old Version", YouTube Video https://www.youtube.com/watch?v=FRUaOFWiDRw&t=1s, published on Jun. 28, 2010 (see sample screenshots, pp. 1-9).
Propelinteractive, "MTI LP3 Product Mounting", YouTube Video https://www.youtube.com/watch?v=KX4TEuj1jCl, published on Jun. 23, 2010 (see sample screenshots, pp. 1-11).
Prosecution History for U.S. Appl. No. 15/367,028, filed Dec. 1, 2016.
Prosecution History for U.S. Appl. No. 15/656,520, filed Jul. 21, 2017.
Prosecution History for U.S. Appl. No. 15/724,914, filed Oct. 4, 2017.
Prosecution History for U.S. Appl. No. 16/001,601, filed Jun. 6, 2018.
Prosecution History for U.S. Appl. No. 16/001,631, filed Jun. 6, 2018.
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.
Retailgeek, "Virtual Tour of MTI Retail Innovation Center in 2009," YouTube Video https://www.youtube.com/watch?v=-wUvcDAmhj0, published on Aug. 2, 2010 (see transcript and sample screenshots, pp. 1-20).
Reuters, "MTI Begins Shipping Freedom™ Universal 2.0 Merchandising Solution", Oct. 1, 2008, pp. 1-3.
"Solution for 1st Generation Apple Pencil", InVue, 2019, 1 page.
"Solution for 2nd Generation Apple Pencil", InVue, 2019, 1 page.
U.S. Appl. No. 16/355,059, filed Mar. 15, 2019.
U.S. Appl. No. 61/607,802, filed Mar. 7, 2012.
U.S. Appl. No. 61/620,621, filed Apr. 5, 2012.
U.S. Appl. No. 61/774,870, filed Mar. 8, 2013.
U.S. Appl. No. 61/884,098, filed Sep. 29, 2013.
Unicam Europe, "Freedom Lp3 Apr. 17, 2009", SlideShare Presentation https://www.slideshare.net/Borfu/freedom-p3-41709, published on Jul. 28, 2009 (pp. 1-9).

* cited by examiner

MOTION SENSING CABLE FOR TRACKING CUSTOMER INTERACTION WITH DEVICES

CROSS-REFERENCE AND PRIORITY CLAIM TO RELATED PATENT APPLICATIONS

This patent application claims priority to U.S. provisional patent application Ser. No. 62/796,188, filed Jan. 24, 2019, and entitled "Motion Sensing Cable", the entire disclosure of which is incorporated herein by reference.

This patent application is also related to U.S. patent application Ser. No. 16/257,837, filed this same day, and entitled "Motion Sensing Cable for Intelligent Charging of Devices", the entire disclosure of which is incorporated herein by reference.

INTRODUCTION

The inventors believe that improvements are needed in the art where more intelligence is to be built into conductive cables for electronic devices. To provide such intelligence, the inventors disclose that a motion sensor can be included in a conductive cable. Thus, as a user interacts with an electronic device connected to the conductive cable, a motion signal generated by the motion signal can be leveraged in any of a number of different ways.

For example, the motion signal can be used to control a charging signal that is passed by the conductive cable to the electronic device. As an example, a charging signal delivered by the cable to the connected electronic device can be reduced in response to the motion signal detecting motion of the cable. Thus, if a user were to lift the electronic device connected to the cable, this would cause the cable to reduce the charging signal delivered to the electronic device. As an example, the charging signal can be reduced to zero in response to a detected lift. Thereafter, when a user returns the electronic device to a rest position, the charging signal could be increased or resumed if charging is needed. Such intelligent charging can be useful for a wide array of electronic devices. For example, with devices such as smart phones and tablet computers, such intelligent charging can help avoid prolonged states of constant charging for the device, which can adversely impact battery life for the electronic device.

Moreover, for other classes of electronic devices—where the device may not be fully operational while being charged—such intelligent charging can be extremely advantageous, particularly in a retail merchandising setting. It is desirable for a retailer to display electronic devices that are available for sale to customers in a manner that allows the customer to interact with and use the electronic device while it is on display. This creates a challenge, however, for devices that are not fully operational while being charged because the devices nevertheless need to be charged so that the device has sufficient power to be operational while it is on display. Examples of such devices may include electronic styluses, wearable devices (e.g., smart watches), digital cameras, virtual reality (VR) goggles/headsets, handheld global positioning system (GPS) devices, range finders, etc. As a solution to this problem, the motion sensor and motion signal can be used to detect movement of the cable, which in turn indicates movement of the connected electronic device, which can be interpreted as a customer lift of the electronic device. The charging signal can then be cut off so that the device will be operational after the customer lifts the device and attempts to use it.

As another example, the motion signal can be used to generate data indicative of customer interaction with the electronic device. As noted above, a retailer may choose to display an electronic device for sale while it is connected to the motion sensing cable. While no customers are interacting with the electronic device, it is expected that the electronic device will be at rest, and the motion sensing cable will not detect any motion. However, a customer lift of the connected electronic device will in turn trigger the motion sensor in the motion sensing cable to detect motion. This detected motion can be interpreted as a customer lift of the electronic device. Data representative of such customer interaction with the electronic device can then be communicated to a remote computer system. Merchandisers and retailers can then use such data for tracking and analysis to enhance knowledge such as which products are popular with customers, which positions in retail stores get the most customer traffic, etc. Further still, by including the intelligence that drives such analytics data in the cable itself, retailers and merchandisers are provided with a sleeker option for product display than would be available via conventional puck-base-tether product display systems.

These and other features and advantages of the present invention will be described hereinafter to those having ordinary skill in the art.

DETAILED DESCRIPTION OF EXAMPLE EMBODIMENTS

Figure 1A:
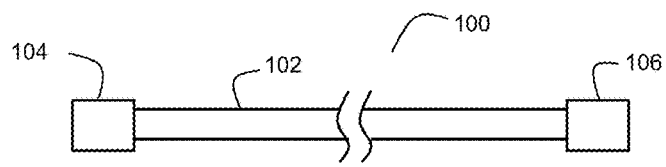
FIG. 1A shows an example embodiment of a motion sensing cable.

FIG. 1A shows an example motion sensing cable 100. The cable 100 includes a conductor 102, a first longitudinal end 104, and a second longitudinal end 106. As can be seen, the first and second longitudinal ends 104 and 106 are at opposite ends of the conductor 102. End 104 can be adapted for detachable connection with an electronic device, and end 106 can be adapted for detachable connection with a power source. Conductor 102 can be a flexible conductor enclosed in an insulating sheath. It should be understood that conductor 102 may include multiple conductors. The length chosen for cable 100 can be selected by a practitioner to meet the needs of a particular intended use. As an example, the cable 100 can have a length of approximately 80 inches; however it should be understood that other lengths could be readily employed.

Figure 1B:
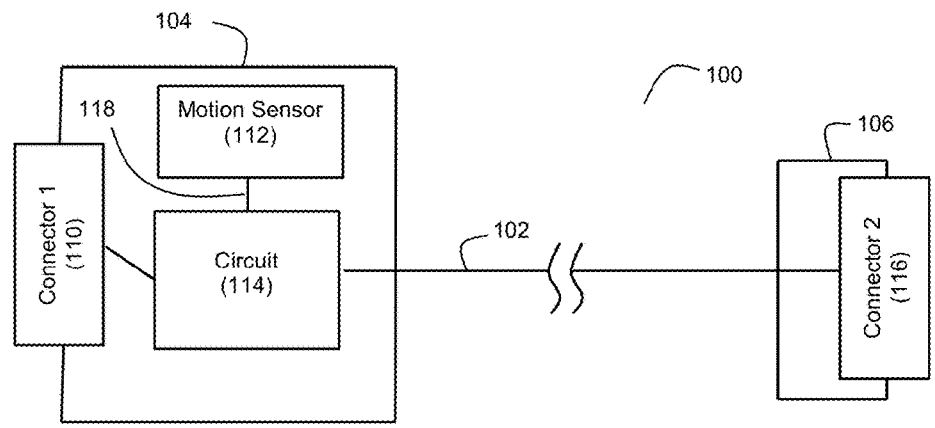
FIG. 1B shows an example component view of the motion sensing cable of FIG. 1A.

FIG. 1B shows an example component view of the motion sensing cable of FIG. 1A. End 104 can include a connector 110 through which the cable 100 can detachably connect with an electronic device. The connector 110 can take any form suitable for connecting with a complementary connector of the electronic device or an adaptor for the electronic device. As examples, the connector 110 may take the form of a Lightning connector, a USB connector, a mini-USB connector, a micro-USB connector, a USB-C connector, inductive charging pads, proprietary connectors such as those often used in digital cameras, etc. End 106 can include a connector 116 through which the cable 100 can detachably connect with a power source. The connector 116 can take any form suitable for connecting with a complementary connector of the power source or an adaptor for the power source. As examples, the connector 116 may take the form of a 2-prong or 3-prong electrical plug, a USB connector, a mini-USB connector, a micro-USB connector, a USB-C connector, inductive charging pads, proprietary connectors such as those often used in digital cameras, etc. Thus, when the cable 100 is connected to an electronic device and a power source via ends 104 and 116, power can be delivered from the power source to the electronic device via the conductor 102. Such power can take the form of an output current in the form of a charging signal that is used to charge a battery resident in the electronic device.

End 104 also includes a motion sensor 112 and a circuit 114. The connector 110, motion sensor 112, and circuit 114 can be enclosed in a housing formed of plastic or a composite material at end 104. As explained in greater detail below, movement of the cable 100 will cause the motion sensor 112 to generate a motion signal 118 that is indicative of motion for the cable 100, and circuit 114 can selectively control the power that is delivered to the electronic device via connector 110 based on this motion signal 118. In an example embodiment, the motion sensor 112 can be an accelerometer. However, in other example embodiments, the motion sensor 112 can take the form of vibration sensors, reed switches, etc. As an example, the circuit 114 can selectively control the charging signal delivered to the electronic device via connector 110 by selectively opening and closing a switch, where the open switch condition operates to eliminate a charging signal while the closed switch condition permits a charging signal.

While the example of FIG. 1B shows the motion sensor 112 and circuit 114 being located at end 104 of the cable 100, it should be understood that a practitioner might choose to position the motion sensor 112 and circuit 114 at other locations along the cable. For example, the motion sensor 112 and/or circuit 114 could be positioned at some intermediate location along the length of the conductor 102. As another example, the motion sensor 112 and/or circuit 114 could be positioned at end 106.

Figure 2A:
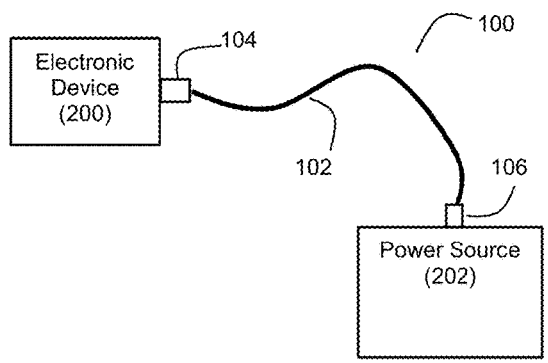
FIG. 2A shows an example motion sensing cable connected to an electronic device and a power source.

FIG. 2A shows an example where the motion sensing cable 100 is connected to an electronic device 200 and a power source 202. As noted above, power can be delivered from the power source 202 to the electronic device 200 via cable 100. The power source 202 can take the form of any suitable source of electrical power. For example, the power source 202 can be a power outlet. Further still, it should be understood that connector 116 of the motion sensing cable can connect with the power source 202 indirectly if desired by a practitioner, such as connecting to a power outlet via a power brick that gets plugged into a power outlet. As an example, the electronic device 200 can be a handheld electronic device such as a handheld electronic device that includes a rechargeable battery. Such a battery can be charged via a charging signal derived from the power that is available from power source 202. Examples of electronic devices 200 can include smart phones, tablet computers, wearable devices (such as smart watches and the like), electronic styluses (such as the Apple Pencil), digital cameras, VR goggles/headsets, handheld global positioning system (GPS) devices, range finders, etc. As noted above, example embodiments of the motion sensing cable 100 can be particularly advantageous when used in combination with electronic devices that are not fully operational while charging, such as certain models of electronic styluses, wearable devices, digital cameras, and VR goggles/headsets because the charging signal can be selectively turned on/off in response to the motion signal produced by the motion sensor, thereby enabling such electronic devices to be used in a retail setting when lifted by customers.

Figure 2B:
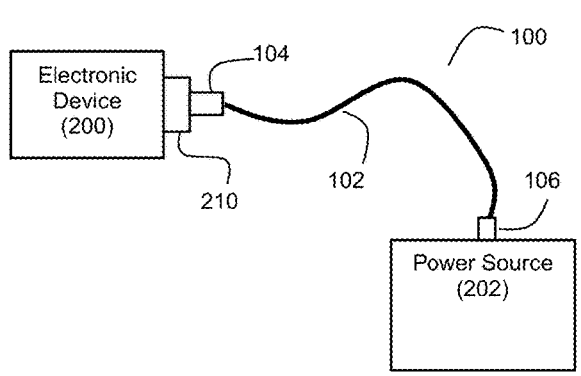
FIG. 2B shows an example motion sensing cable connected to an electronic device (via an adaptor) and a power source.

FIG. 2A shows an example where the connector 110 of the motion sensing cable 100 directly connects with a complementary connector of the electronic device 200. However, it should be understood that connector 110 of the motion sensing cable can connect with the electronic device 200 indirectly if desired by a practitioner, such as by connecting to an adaptor 210 that connects to the electronic device 200 (see FIG. 2B).

Figure 2C:
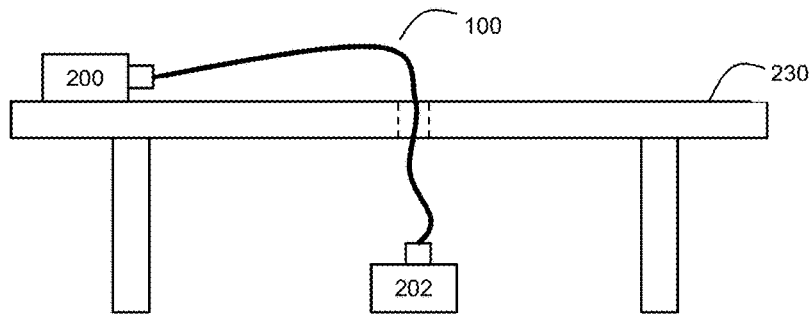
FIG. 2C shows an example motion sensing cable connected to an electronic device and a power source, where the electronic device is displayed on a table.
Figure 2D:
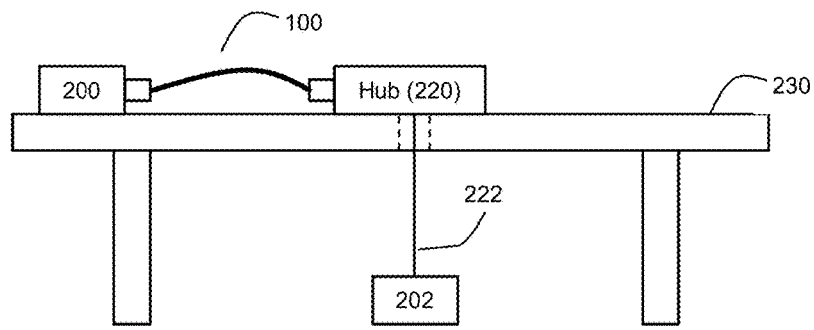
FIG. 2D shows an example motion sensing cable connected to an electronic device and a power source (via a hub), where the electronic device is displayed on a table.

FIG. 2C shows an example where the electronic device 200 is displayed on a table 230 while connected to a power source 202 via the motion sensing cable 100. For example, the power source 202 can be located below or on an underside of the table 230, and the cable 100 can be run through a hole in the table 230. Electronic device 200 can be displayed on the table while connected to the power source 202 via cable 100. FIG. 2D shows another example where the electronic device 200 is connected to a hub 220 via the motion sensing cable 100, and the hub 220 is connected to the power source 202. Thus, FIG. 2D shows an example where the cable 100 is indirectly connected to the power source 202 (via hub 220 in this example). The hub 220 can take the form of a security hub for a table 230 in a retail store, and the hub 220 may be connectable to multiple electronic devices 200 at the same time. An example of such a hub 220 can be the modular puck disclosed in U.S. provisional patent application 62/628,885, filed Feb. 9, 2018, entitled "Systems and Methods for Retail Security", the entire disclosure of which is incorporated herein by reference. With the examples of FIGS. 2C and 2D, the cable 100 can selectively control a charging signal provided to the electronic device 200 based on the motion signal 118 produced by motion sensor 112. While the electronic device 200 is at rest on the table 230, it can be expected that the motion sensor 112 will not detect motion (or at least any detect motion will be below a triggering threshold). Thus, while at rest, the cable 100 can pass a charging signal to the electronic device 200. However, as noted in example embodiments below, other factors in addition to cable motion can influence the charging signal if desired by a practitioner. In response to a user lifting the electronic device 200 from the table 230, this will be registered as motion by the motion sensor 112, and the cable 100 can reduce the charging signal (which may include eliminating the charging signal if desired by a practitioner).

FIGS. 3A-3D show example process flows for charge control based on detected motion by the motion sensor 112 of cable 100.

Figure 3A:
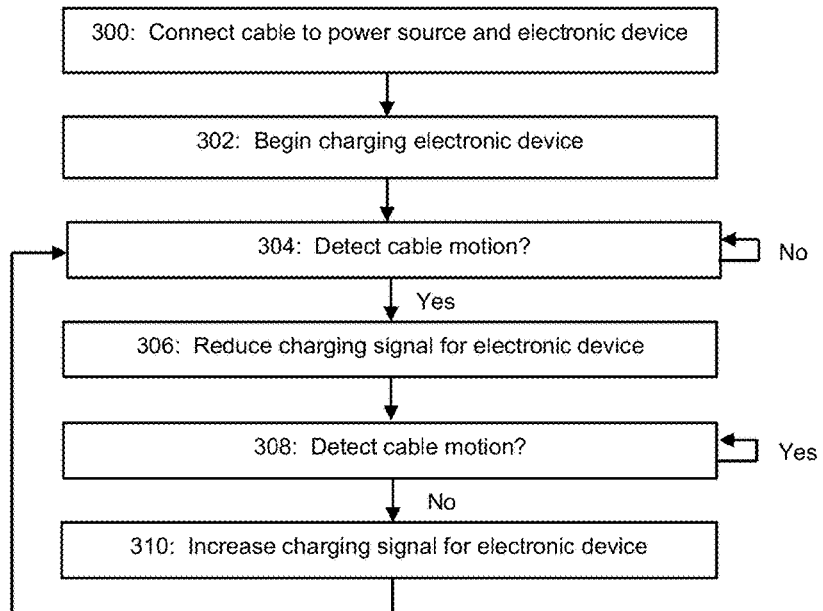
FIGS. 3A-3D show example process flows for charge control based on motion of the motion sensing cable.

The example process flow of FIG. 3A begins at step 300, where the cable 100 is connected to power source 202 and electronic device 200 via connectors 110 and 116 as discussed above. At step 302, the cable 100 begins providing a charging signal to the connected electronic device 200. At step 304, a determination is made as to whether the cable 100 is in motion. This determination can be made by circuit 114 based on motion signal 118 from motion sensor 112. If no motion is detected, the charging signal can continue. However, if motion is detected, the cable 100 effects a reduction in the charging signal (step 306). In some embodiments, this reduction can be the elimination of the charging signal by reducing the charging signal to zero. In other embodiments, this reduction can be reducing the power in the charging signal (e.g., a 50% reduction). For example, to eliminate the charging signal, a switch in circuit 114 (e.g., a FET switch) can be controlled to be an open state so that the cable 100 is in an open circuit condition with respect to the conductive path between power source 202 and electronic device 200. As another example, circuit 114 can adjust an analog control voltage in response to motion detection. As another example, circuit 114 can toggle an output enable signal on the power supply to reduce or eliminate the charging signal. The circuit 114 may include a processor such as a microcontroller to implement such decision-making and control (e.g., actuating a switch, etc.). As yet another example, to reduce but not eliminate the charging signal, the circuit 114 can change an analog control signal to the power supply as noted above. The level of this analog control signal can be a function of the activity detected by the motion sensor 112. For example, a digital to analog converter (DAC) output of a microcontroller can be used for such a purpose (such as controlling the DAC output to reduce its output voltage in response to detection of motion by the motion sensor 112).

Thereafter, at step 308, another determination is made as to whether the cable 100 is in motion. If motion is detected, the charging signal can remain reduced. However, if no motion is detected, the cable 100 effects an increase in the charging signal (step 310). In example embodiments where the circuit 114 uses a switch to control the charging signal, the circuit 114 can operate the switch to be in a closed state at step 310 to thereby provide a conductive path through which delivery of the charging signal to the electronic device 200 can be resumed. But, as noted above, other techniques for controlling the charging signal at step 310 could be used, such as adjusting control signal (e.g., via a DAC output), toggling an output enable, etc. In this fashion, the process flow of FIG. 3A allows for the cable 100 to selectively control how the electronic device 200 is charged.

Figure 3B:
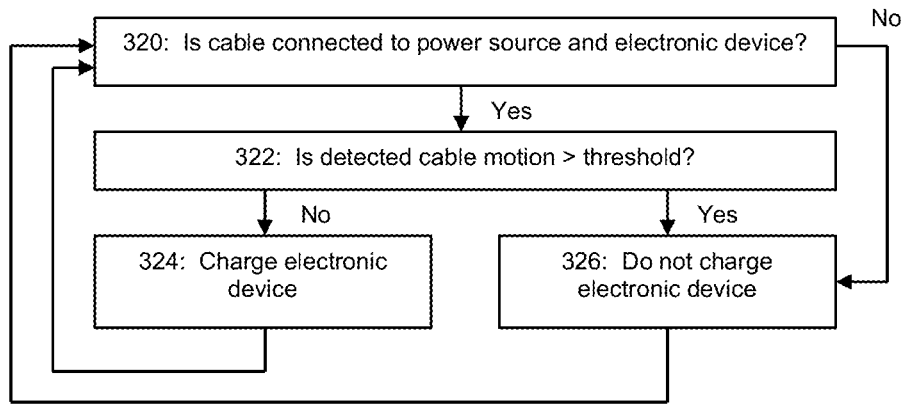

FIG. 3B shows another example process flow for selectively controlling the charging signal based on the motion signal 118 from the motion sensor 112. At step 320, a determination is made as to whether the cable 100 is connected to power source 202 and electronic device 200. If not, it then follows that the power source 202 will not deliver a charging signal to the electronic device 200 via cable 100. But, if connected at step 320, the process flow proceeds to step 322. At step 322, the circuit 114 determines whether the motion signal 118 exceeds a threshold. If not, the process flow proceeds to step 324 where the cable 100 provides a charging signal to the electronic device 200. If so, the process flow proceeds to step 326 where the cable 100 does not charge the electronic device 200. As noted above, step 326 can be implemented in an any of a number of manners. For example, the circuit 114 can open a switch to thereby create a break in a conductive path between power source 202 and electronic device 200 via cable 100. From steps 324 and 326, the process flow can return to step 320 for repeat iterations.

The threshold used at step 322 to detect motion can be tailored by a practitioner to reliably detect lifts of the electronic device 200 by a user. Accordingly, the threshold can be set so that false detections are reduced by avoiding triggering a lift detection as a result of insubstantial cable movement. Furthermore, multiple conditions can be used as the threshold if desired by a practitioner. For example, the conditions can define the magnitude and duration of the motion signal 118 that are needed to trigger a conclusion that the electronic device has been lifted. Such a threshold can then define a signal pattern for the motion signal 118 when the electronic device is lifted. For instance, an example motion sensor 114 can be capable of detecting motion or vibration in a milliseconds time frame. Deliberate interaction by a human such as a lifting of the device 200 would not take place on a sub-second event duration. Accordingly, the motion signal can be debounced so that short duration motions or vibrations will not be falsely identified as lifts. The duration threshold used at step 322 can be set by a practitioner so that the motion persists in a manner consistent with a lift event by a person before signaling that a lift event has occurred.

Figure 3C:
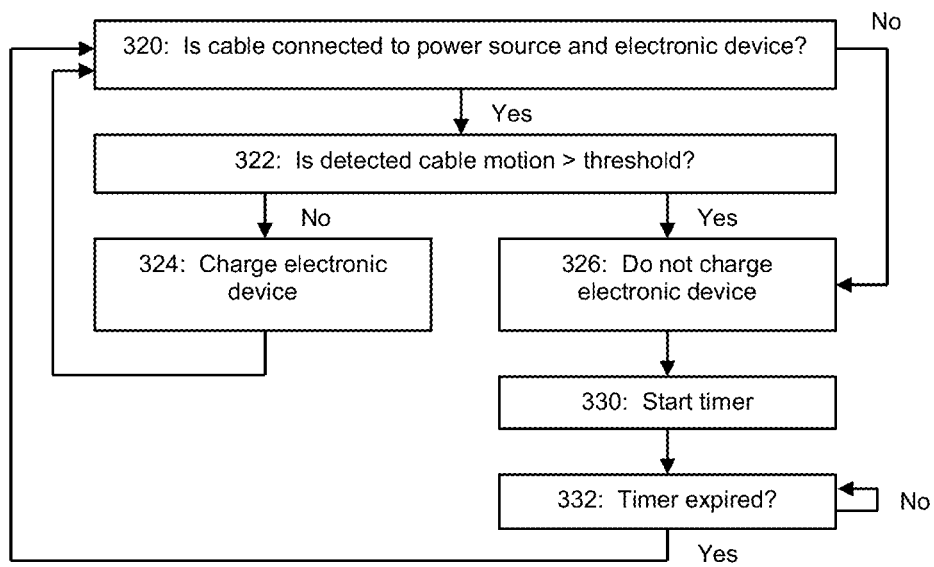

FIG. 3C shows another example process flow for selectively controlling the charging signal based on the motion signal 118 from the motion sensor 112. In the example of FIG. 3C, additional factors are used by circuit 114 to control the charging signal. For example, a timer can be used to define a minimum time window for the "no charging" state of the cable 100. Thus, in response to detecting cable motion at step 322, the circuit 114 can start a timer at step 330. At step 332, the circuit waits for the timer to expire. After expiration, the process flow returns to step 320 and the charging signal can be resumed if there is no more cable motion. Such a timer can define a time window that is sufficient to allow a customer to lift the electronic device and test it in a typical retail store encounter. For example, a practitioner might conclude that a substantial portion of customers interact with the electronic device for about 60 seconds after lifting it. The time window defined by steps 330 and 332 can then be set to allow for the "no charging" state to continue during such a time period. In this fashion, for electronic devices that are not fully operational while being charged, the time window allows for the device to still be used even if the customer may be holding the device steady at some point during the time window.

Further still, the circuit 114 can use timers in other fashions if desired by a practitioner. For example, a timer can also be used to prevent the charging signal from being delivered to the electronic device for too long. Prolonged periods of constant charging can adversely affect the electronic device (for example, by damaging its battery). Thus, a practitioner may find it useful to have circuit 114 place time constraints on how long the charging signal can be delivered to the electronic device while the cable 100 is at rest. For example, the circuit 114 can be configured to limit the charging signal delivery to 30 minutes per every 6 hours (or by some other time constraint).

Figure 3D:
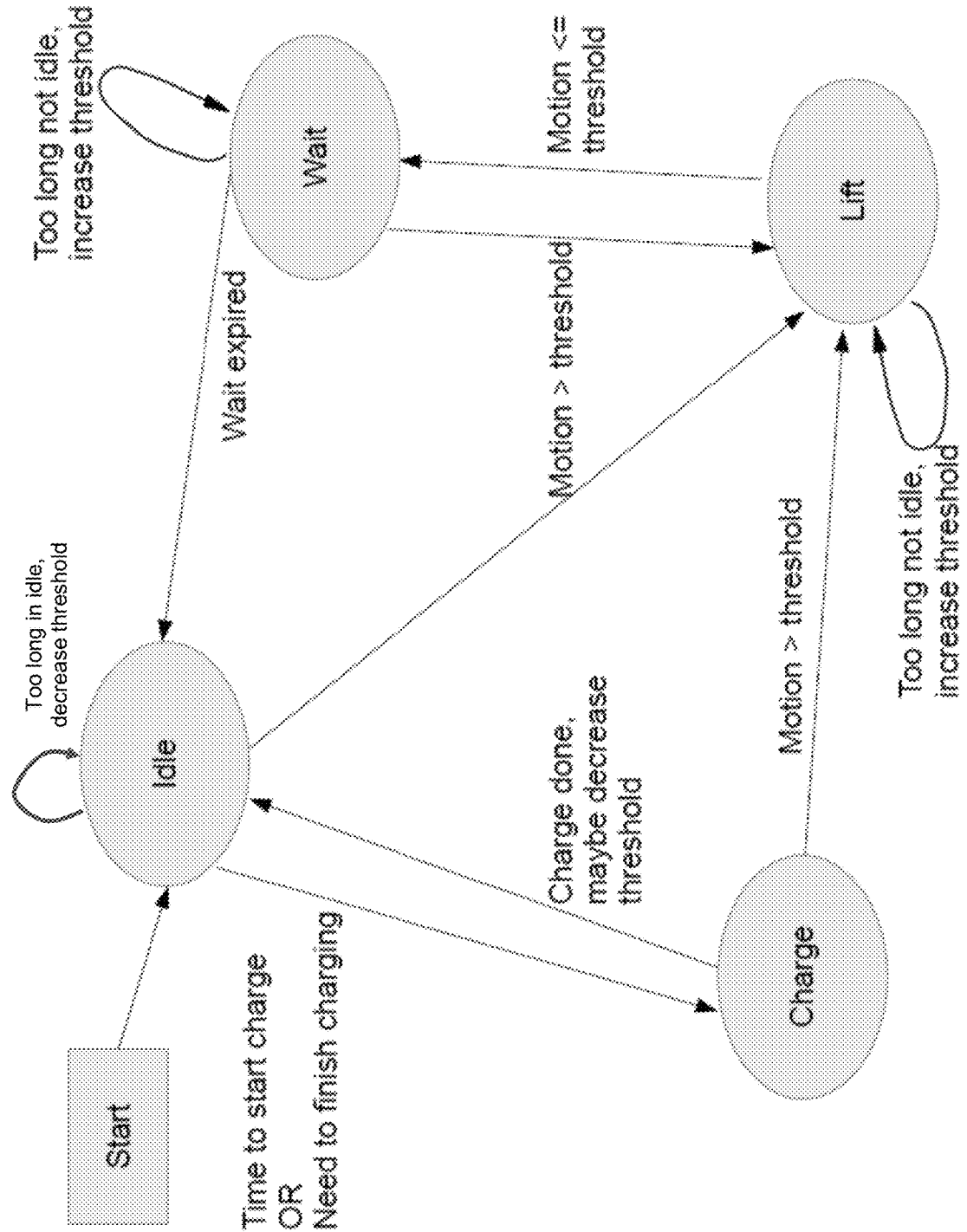

FIG. 3D depicts another example process flow for selectively controlling the charging signal. In the example of FIG. 3D, the cable 100 has 4 different states: (1) an "Idle" state where the cable 100 does not deliver a charging signal to the electronic device 200, (2) a "Charge" state where the cable 100 delivers a charging signal to the electronic device 200, (3) a "Lift" state where the cable 100 does not deliver a charging signal to the electronic device 200, and (4) a "Wait" state where the cable 100 does not deliver a charging signal to the electronic device 200. Each state can be associated with different conditions that cause transitions to other states, as shown by FIG. 3D.

The process of FIG. 3D starts when the cable 100 is connected to the electronic device 200 and power source 202. Upon connection, the cable is in the Idle state. If the motion signal 118 detected by motion sensor 112 exceeds the threshold while the cable is in the Idle state, then the cable transitions to the Lift state. If there is no motion in excess of the threshold while the cable is in the Idle state and a timer circuit concludes that it is not the appropriate time to charge the electronic device, then the cable remains in the Idle state. If there is no motion in excess of the threshold while the cable is in the Idle state and a timer circuit concludes that it is the appropriate time to charge the electronic device, then the cable transitions to the Charge state.

As indicated above, a timer circuit defined by circuit 114 can implement various time windows for controlling charging actions of the cable 100 with reference to the FIG. 3D process flow. For example, timers defined by circuit 114 can be configured to (1) set a first time duration (e.g., 30 minutes), and (2) set a second time duration (e.g., 6 hours), where the second time duration is longer than the first time duration, and where the first time duration serves as the maximum time to be spent charging the electronic device during the second time duration. Thus, in the example where the first time duration is 30 minutes and the second time duration is 6 hours, this means that the circuit 114 will permit the cable 100 to provide charge to the electronic device for a maximum of 30 minutes every 6 hours. If cable motion in excess of the threshold causes the cable 100 to stop charging the electronic device, the timer can be effectively paused. Thereafter, the timer can be resumed after cable motion stops. Meanwhile, the charging time can be reset after expiration of the second time duration. To implement such timing controls, the circuit 114 can include a timer circuit defined by a processor such as a microcontroller, where the processor tracks time and executes software instructions to perform the timing control logic.

Returning to the FIG. 3D process flow, when the cable 100 is in the Idle state and there is no cable motion in excess of the threshold, the circuit 114 will determine whether it is time to start charging (e.g., is the cable 100 in a fresh second time duration and has not yet used any of its charging time defined by the first time duration?) or whether it is time to resume/finish charging (e.g., does the cable 100 still have charge time remaining within the first time duration for the current second time duration?). If it is time to charge based on either of these criteria, then the cable 100 transitions to the Charge state.

When the cable 100 is in the Charge state, the cable 100 delivers the charging signal to the electronic device. If the first time duration expires while the cable 100 in the Charge state, then the cable 100 returns to the Idle state (where it waits for a fresh second time duration to become eligible for charging again). As part of this transition back to the Idle state, the circuit 114 can also make a decision as to whether the threshold used for detecting cable motion should be adjusted. Also, if the cable 100 moves in excess of the threshold while the cable 100 is in the Charge state, then the cable 100 will transition to the Lift state.

With respect to possible adjustments of the cable motion detection threshold, it may be reasonable to conclude that the detection threshold is not sensitive enough if no lifts are found to be present over a specified time period (e.g., over two consecutive charging events). If this condition is found to be met, then the system could downwardly adjust the detection threshold so that shorter duration motion events will trigger lift detection. This detection threshold can then be adjusted up or down periodically (e.g., each cycle) to achieve a goal such as a target number of lift events per cycle. This would serve to auto-tune the squelch of the circuit 114 to heightened sensitivity over the course of, say, 10 to 20 cycles. This can also allow for auto adjustment in the event that the ambient vibration in the environment changes (for example, it may be the case that the device 200 is moved near a door that slams regularly and falsely trips the lift detection).

When the cable 100 is in the Lift state, the circuit 114 will continue to check whether there is cable motion in excess of the threshold. If not, the cable 100 transitions to the Wait state. Otherwise, the cable 100 remains in the Lift state. The circuit 114 can implement another timer to assess whether the cable 100 remains in the Lift state for too long (where this another timer serves to define an excessive lift time window). For example, if the circuit 114 continues to detect cable motion in excess of threshold for a sustained duration (e.g., 15 minutes), it may be the case that the motion threshold is too low such that the circuit 114 is misinterpreting the electronic device at rest as being in a lift condition. Accordingly, if the cable 100 remains in the Lift state for a time duration longer than the excessive lift time window, the circuit 114 may increase the motion threshold. As noted above, auto-tuning of the motion threshold can be implemented periodically, such as per cycle. Further still, when the cable 100 goes into the Lift state, the circuit 114 can generate data indicative of customer interaction with the electronic device. As explained below, this data can then be communicated by the circuit 114 to an external computer system to facilitate tracking and analysis of customer interactions with the electronic devices on display in a retail store. As part of this, the circuit 114 can also measure how long the cable 100 remains in the Lift state, which can serve as a proxy for a measure of how long the customer interacted with the electronic device. This measurement can be included as part of the data that gets communicated to the external computer system.

When the cable 100 is in the Wait state, checks to see if a transition to the Idle or Lift state is appropriate. Thus, the Wait state serves as a holding pattern to assess whether the cable 100 has stabilized back to the Idle state or is still moving sufficiently to merit a transition back to the Lift state. If the cable 100 experiences motion in excess of the threshold while it is in the Wait state, then the cable 100 will transition back to the Lift state. Also, the circuit can include a timer that defines an excessive wait time window that will operate in a similar fashion as the excessive lift time window discussed above. Accordingly, if the cable 100 remains in the Wait state for a time longer than the excessive wait time window, then the circuit 114 can increase the motion threshold. This can help prevent the cable 100 from repeatedly transitioning back to the Lift state in the event of small cable motions that are misinterpreted as lifts or customer handling. The circuit 114 can also maintain another timer that defines a wait time duration for the Wait state. This value will define the maximum amount of time that the cable will remain in the Wait state. Accordingly, if the cable 100 remains in the Wait state longer than the wait time duration, then the cable 100 will transition back to the Idle state (thereby ending the duration of the lift event). It should be understood that the wait time duration can be set to a value greater than the value used for the excessive wait time window. The wait time duration can be a fixed value that is set to a reasonable amount of time that the cable 100 can appear idle if it is being interacted with (e.g., the time it might take for someone to read a menu item before making a selection). If another lift event happens before the wait time duration expires, the system returns to the Lift state but does not count this as a separate lift event. If the system gets stuck between the Lift and Wait states for too long (the time away from Idle is too long), then the threshold can be adjusted upward to force the system into the Idle state. Also, it should be understood that if the system remains in the Idle state for too long (according to the goals and desires of a practitioner), then the threshold can be decreased to keep the system in balance.

Accordingly, FIG. 3D shows an example of how the motion signal and a variety of time conditions can be used by circuit 114 to selectively control the charge signal that gets delivered by cable 100 to electronic device 200.

FIGS. 4A-4E show example embodiments of a motion sensing cable 100 for use with an example electronic stylus 400. The electronic stylus 400 can be an accessory for use with a tablet computer or other portable computing device. To be operational, the electronic stylus 400 must be charged, and it may need to be paired (e.g., Bluetooth paired) with the tablet computer or other portable computing device for which it is an accessory. The electronic stylus 400 will have a connector that connects with connector 110, either directly or indirectly via an adaptor (e.g., see adaptor 210 in FIG. 2B). As an example, the electronic stylus can be an Apple Pencil. Many electronic styluses, such as the Apple Pencil, are not operational while they are being charged. Thus, for purposes of effective retail presentation of the electronic stylus, the ability to selectively control the charging signal delivered to the electronic stylus by cable 100 based on motion of the cable 100 is highly advantageous.

Figure 4A:
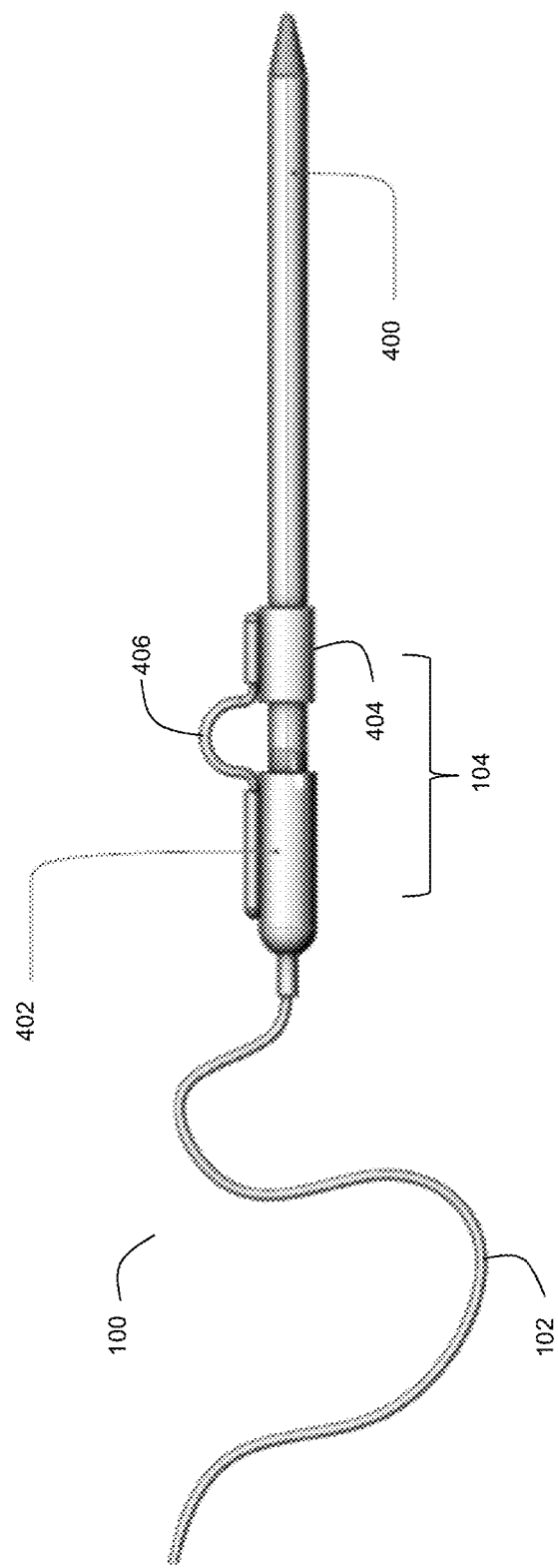
FIGS. 4A-4E show examples of a motion sensing cable for use with an example electronic stylus.

The example of FIG. 4A shows a motion sensing cable 100 for an electronic stylus 400 where the end 104 of the cable 100 includes two portions 402 and 404 joined together via a lanyard cable 406. Portion 402 serves as a removable end cap for the stylus 400, and portion 404 provides physical security by mechanically or adhesively attaching to the stylus 400. For example, portion 404 can be a clamshell connector that clamps around the stylus 400. Adhesive can be included on an inner surface of the portion 404 for physically attaching portion 404 to stylus 400. In another example, a mechanical connection can be made between the clamshell connector and the stylus 400 that locks the stylus in place. A tool can then unlock the connector to permit the clamshell connector to be opened and allow detachment of the stylus.

Figure 4B:
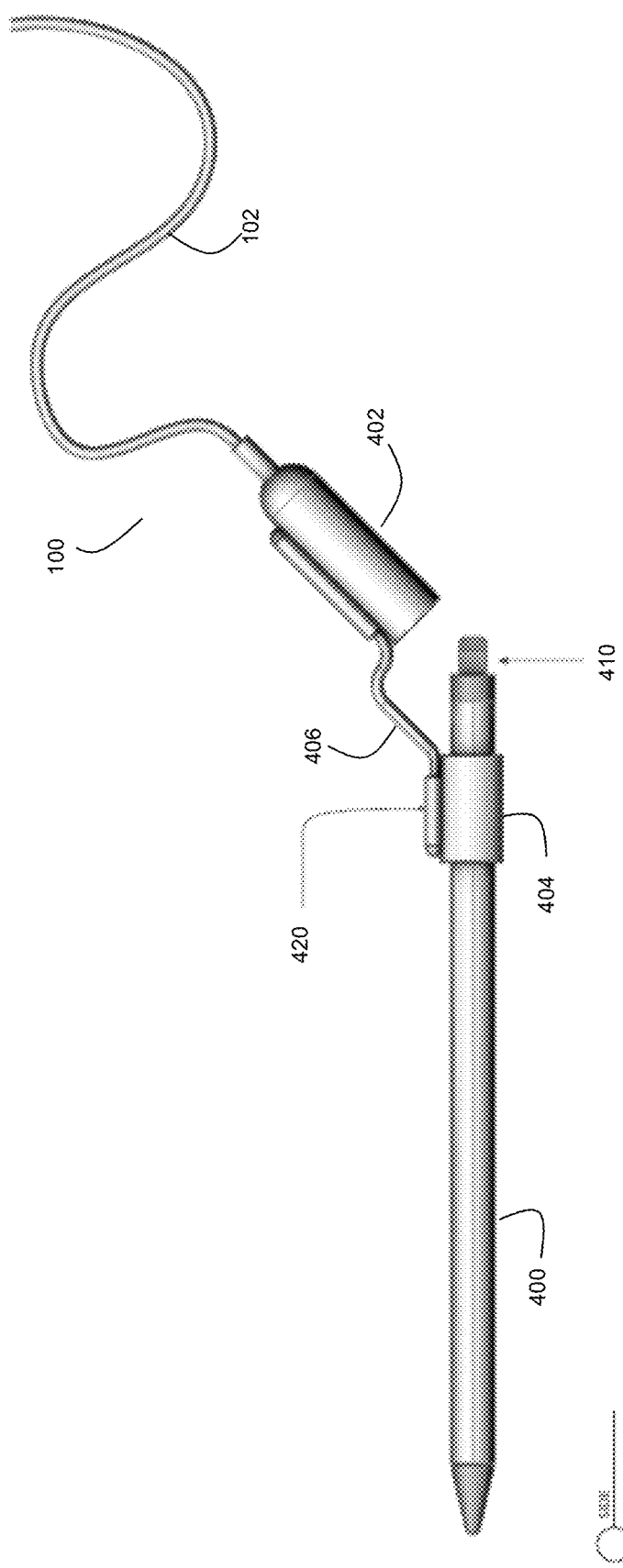

FIG. 4B shows how the end cap portion 402 can be removed from the end of the stylus 400 (while portion 404 remains secured to the stylus 400). End cap portion 402 can include connector 110 (see FIG. 4C). Thus, when end cap portion 402 is placed in position over the end of stylus 400, connector 110 is able to connect with a connector 410 on the end of stylus 400 (either directly or indirectly via an adaptor 450 (see FIG. 4C)). An alarm sensor 420 can be included as part of a sense loop with portion 404 so that a cutting of lanyard cable 406 or other disconnection that separates portion 404 from portion 402 will trigger an alarm.

Figure 4C:
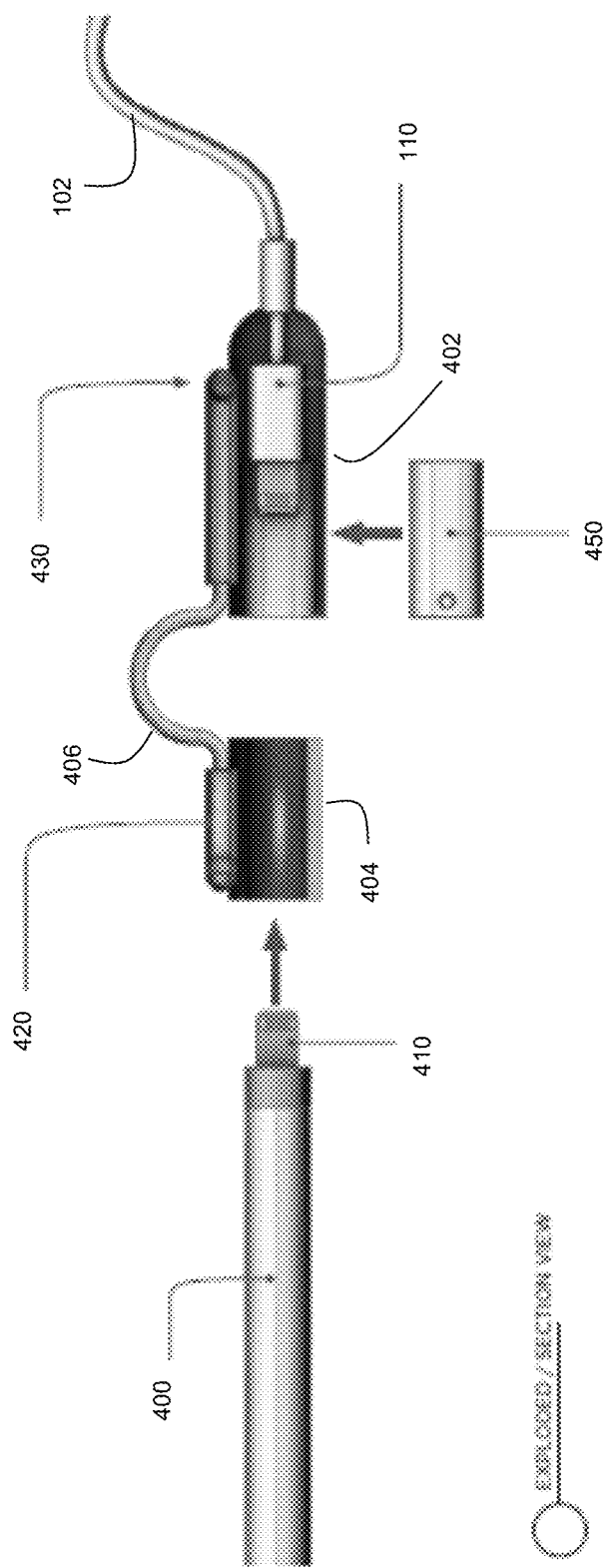

FIG. 4C provides an example exploded cross-sectional view of the motion sensing cable 100 with stylus 400. As can be seen in this example, connector 110 can connect with an adaptor 450 (e.g., an Apple Lightning adaptor if the stylus 400 is an Apple Pencil), and the adaptor 450 can connect with connector 410 on the stylus 400. A light emitting diode (LED) 430 or other light can be included on the cable 100 (e.g., as part of end cap portion 402 as shown by FIG. 4C) to serve as a status indicator for operational status. For example, the LED 430 can be illuminated (or illuminated in a particular color) to indicate an armed status. When armed, the cable 100 can permit a user to remove the end cap portion 402 from the stylus 400 without triggering an alarm; however, unauthorized removal of portion 404 from the stylus would trigger an alarm (via alarm sensor 420).

Figure 4D:
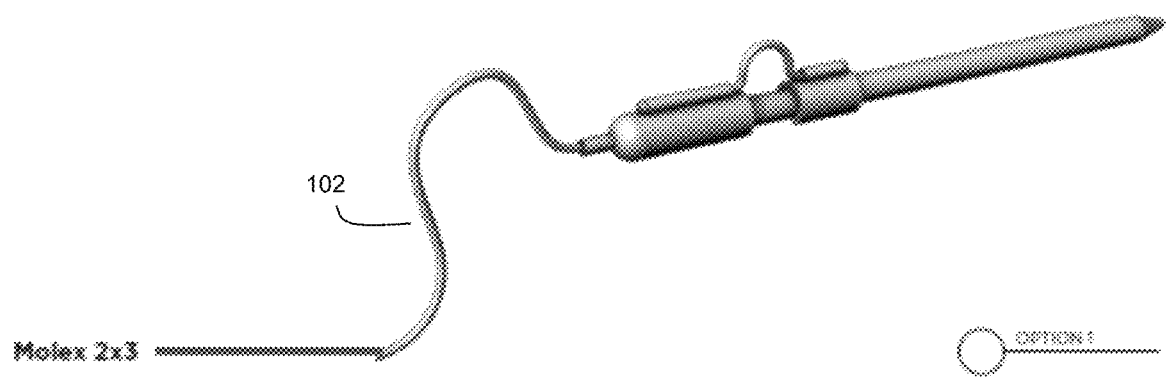
Figure 4E:
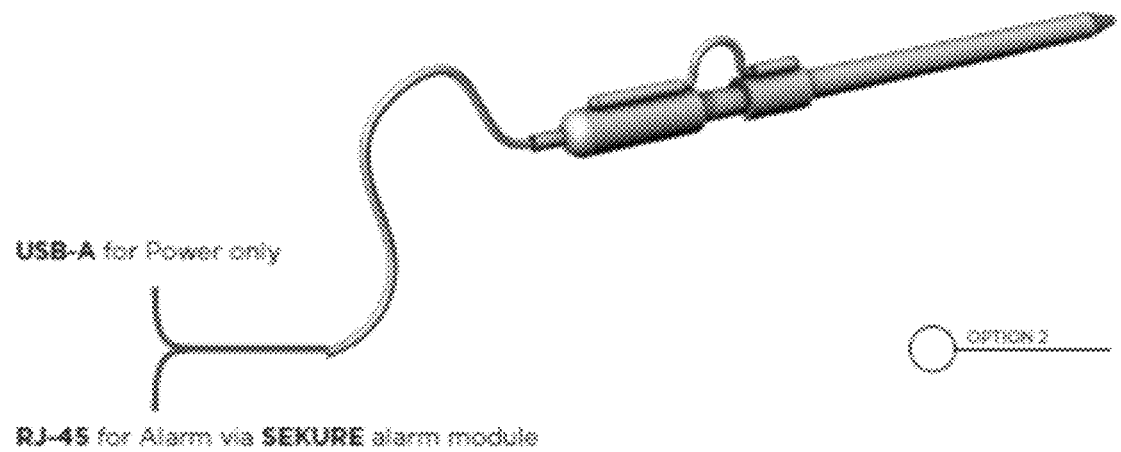

FIGS. 4D and 4E show examples of how the cable 100 can terminate at connector 116. In the example of FIG. 4D, the cable 100 terminates in a Molex 2×3 connector as connector 116, where the Molex 2×3 connector provides both a power signal and a data/security signal. In the example of FIG. 4E, the conductor 102 has a Y termination into a USB-A connector at connector 116 (for power) and an RJ-45 connector at connector 116 (for security/data). However, it should be understood that other cable terminations at connector 116 could be employed if desired by a practitioner.

Figure 5:
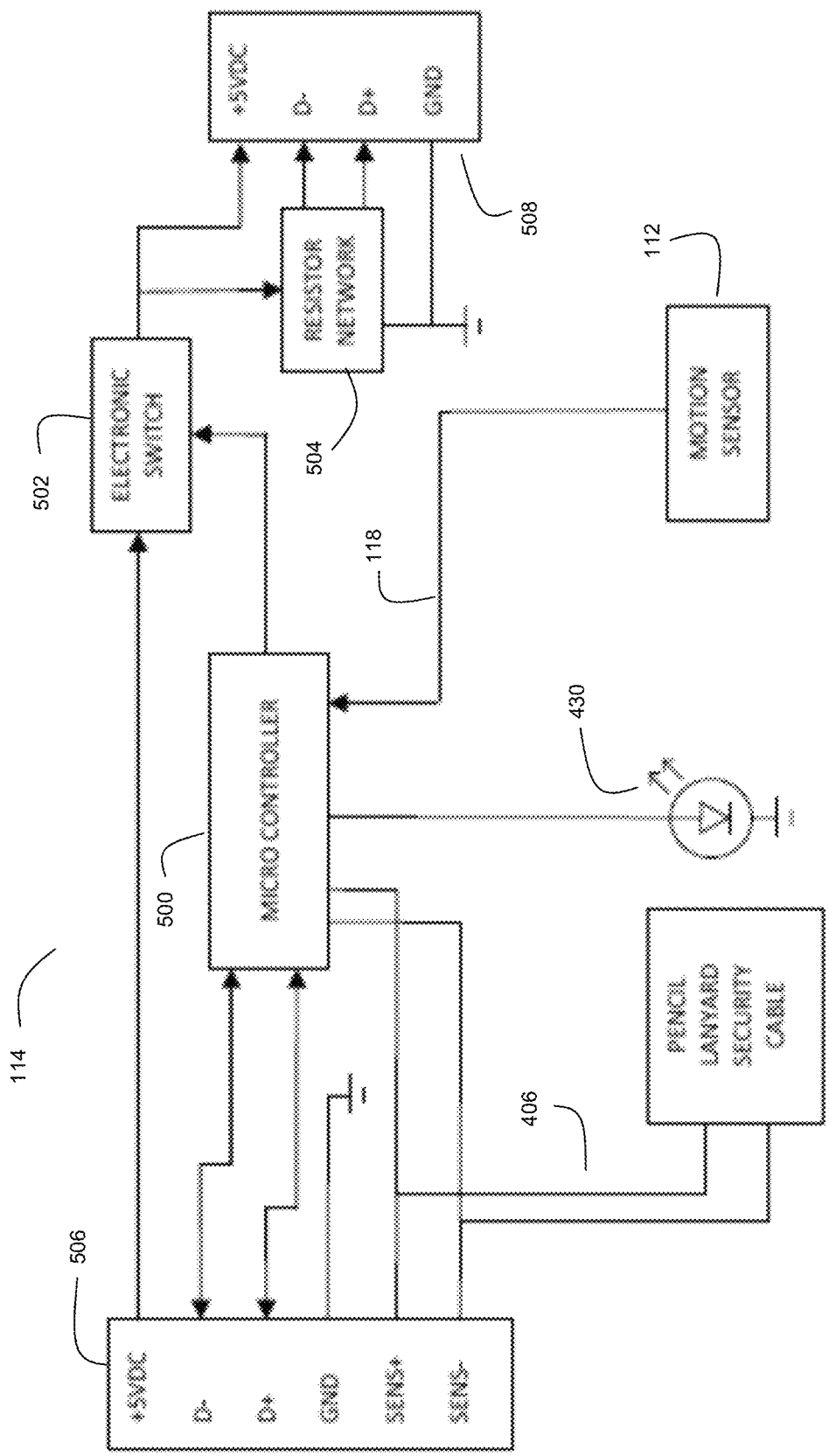
FIG. 5 shows an example circuit diagram for an example motion sensing cable.

FIG. 5 shows an example circuit 114 for an example motion sensing cable 100. In an example embodiment, circuit 114 can be deployed on a circuit board located in cable end 104. Although, as explained above, circuit 114 could be located elsewhere in the cable 100. Motion sensor 112 can also be deployed on the circuit board together with circuit 114.

The circuit 114 can include a processor such as microcontroller 500. The circuit 114 can also include a switch such as electronic switch 502. The state of this switch 502 (open or closed) can control whether a charging signal is delivered to a connected electronic device, and the microcontroller 500 can drive the state of switch 502. Circuit 114, including microcontroller 500 and switch 502, provide electronics for monitoring the electronic device 200 for motion, controlling charging of the electronic device 200, providing security for the electronic device (e.g., via lanyard cable 406), and status reporting (which may include not only lift tracking data reporting but also reporting about charging status) to the main power delivery system at the other end of cable 100. Microcontroller 500 can also control the illumination of LED 430 to indicate whether the cable 100 is armed. To arm the cable 100, a voltage is passed through SENS+. This voltage can be measured on SENS−. If continuity is broken, the system alarms. The microcontroller 500 can thus monitor the voltage on SENS+ and SENS−. If the system is armed, both SENS+ and SENS− can be high. If the system is disarmed, both SENS+ and SENS− can be low. If the system is alarming, the one of SENS+ and SENS− will be high and the other will be low. Further still, the microcontroller 500 can drive the LED 430 to blink or show some other visualization pattern when the cable 100 is charging the electronic device.

Microcontroller 500 can process a motion signal 118 from motion sensor 112 to make a decision about how switch 502 should be controlled. This decision-making by the microcontroller 500 can utilize the process flows of any of FIGS. 3A-3D. In an example embodiment as discussed above in connection with FIGS. 3A-3D, when the cable is initially powered, the microcontroller 500 will check the motion sensor 112 to determine whether the electronic device 200 should be deemed at rest or in motion. The microcontroller 500, at start up, can also start a timer and turn on the electronic switch 502 to begin charging the electronic device 200. The LED 430 can be flashed while the electronic device is being charged. As noted above, after a predetermined amount of time has passed, the microcontroller 500 can stop the charging by turning off electronic switch 502 (and the LED 430 will stop flashing). If the electronic device 200 is picked up or moved during the charging time, the microcontroller 500 will detect this motion via motion signal 118 and terminate the charge signal by turning off the electronic switch 502. When the electronic device 200 later returns to rest, the microcontroller 500 can then resume the charge signal for the rest of the charging cycle by turning on the electronic switch 502. The microcontroller can also report the charging and the detected motion (e.g., as lift data) back to the main power delivery system. The microcontroller 500 can access and execute a plurality of executable instructions that are stored on a non-transitory computer-readable storage medium to implement these operations. For example, these instructions can implement the logic for process flows such as those described above in connection with FIGS. 3A-3D.

The circuit 114 can also include a termination interface 506 for interfacing with different components of the conductor 102. For example, a voltage line (e.g., +5 VDC) can connect a power conductor in conductor 102 with switch 502. Data lines (e.g., D-, D+) can connect signal conductors in conductor 102 with microcontroller 500. Sensor lines (e.g., SENS+, SENS-) can connect sensor signal conductors in conductor 102 with microcontroller 500 and the lanyard security cable 406. Termination interface 506 can also include a ground.

The circuit 114 can also include a termination interface 508 for interfacing with connector 110. For example, the voltage output from switch 502 (e.g., +5 VDC) can connect with a power pin of connector 110 to provide a conductive path for delivering a charging signal to the electronic device 200. Termination interface 508 can also include data connections (e.g., D-, D+) that are connected via resistor network 504. Resistor network 504 sets the charge current in the device, and it can be defined to comply with the desired charge current for the subject device 200. Termination interface 508 can also include a ground.

Figure 6:
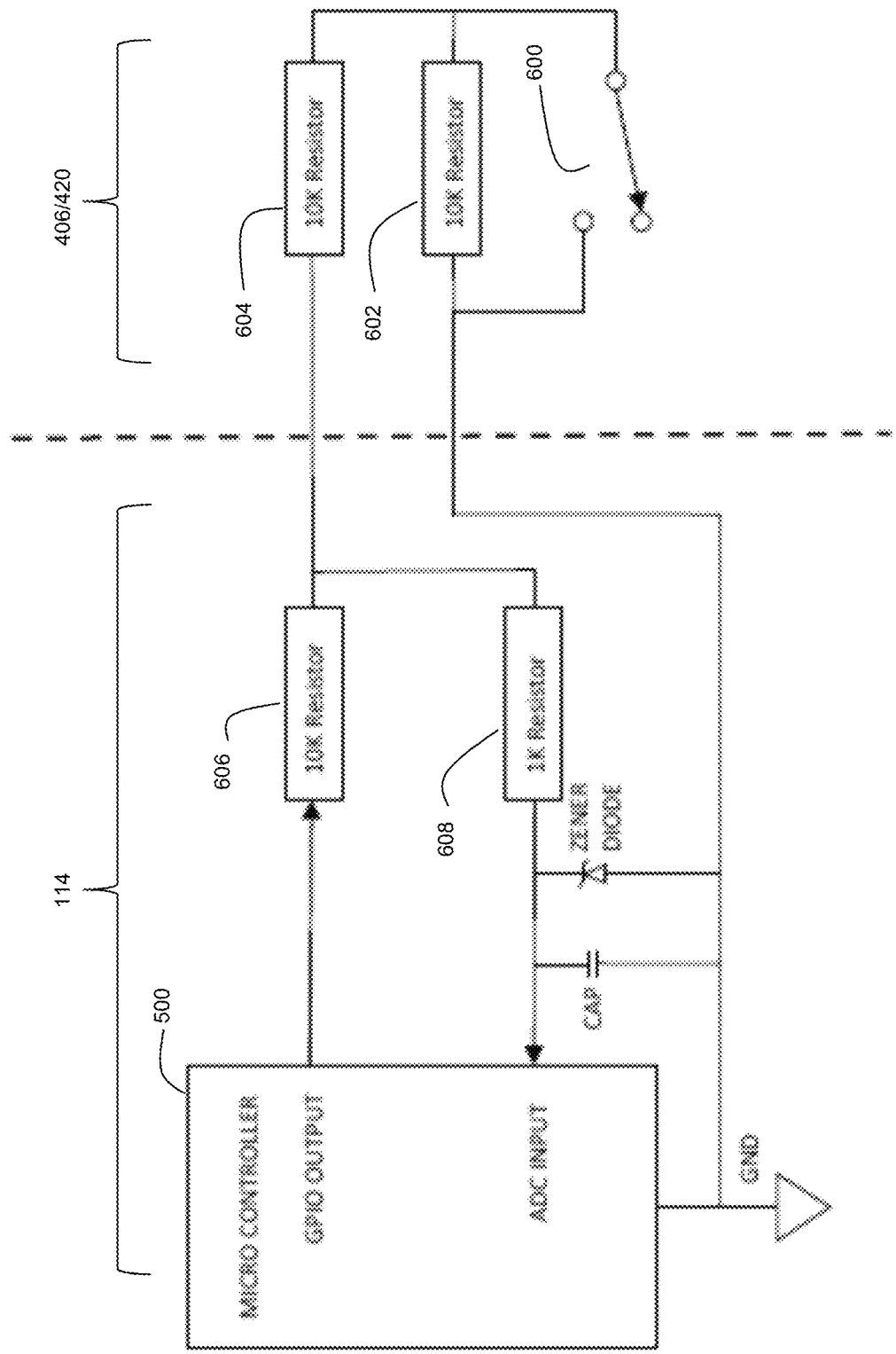
FIG. 6 shows another example circuit diagram for an example motion sensing cable.

The lanyard cable 406 and alarm sensor 420 provide a sense loop with circuit 114 so that a break in the lanyard cable 406 will trigger an alarm condition in the circuit 114. This in turn can cause the microcontroller 500 to transmit an alarm signal via termination interface 506, where this alarm signal can trigger a visual and/or audible alarm (e.g., via hub 220 as shown by FIG. 2D). FIG. 6 shows an example circuit diagram for the sense loop with respect to the lanyard cable 406. The lanyard cable 406 can include a tamper switch 600. This tamper switch will remain closed, unless the lanyard cable 406 is cut or otherwise disconnected from the cable 100, in which case it will be open.

The sense loop arrangement of FIG. 6 can provide the cable 100 with the ability to detect any of the following conditions (1) if the lanyard cable 406 has been cut/severed (open circuit), (2) if the lanyard cable 406 has been short-circuited, (3) if the lanyard cable 406 has the tamper switch 600 in the open position, and (4) if the lanyard cable 406 has the tamper switch 600 in the closed position. The lanyard cable 406 can be polled by the microcontroller 500 by asserting the GPIO pin to a desired voltage (e.g., 3.3 VDC). Then, the microcontroller 500 reads the voltage at the ADC input. The value of this voltage will indicate which of the 4 conditions summarized above is present. For example, in the open circuit condition, there will only be voltage drops across resistors 606 and 608. In the short-circuit condition, there will be no voltage at the ADC input because all of the signal will pass to ground via the short circuit in 406. In the tamper switch open condition, there will be a diversion of signal through resistors 602 and 604 that impacts the voltage seen at the ADC input. In the tamper switch closed condition, there will be a diversion of signal through resistor 604 (but not 602) that impacts the voltage seen at the ADC input. Accordingly, it can be seen that the voltage at the ADC input of FIG. 6 can be different for each of these conditions. The idea is that the contact switch does not present a dead short but a resistive short when it is closed. If a person breaks the wire and shorts the wire leads out, this will present a dead shot which can be detected as a tamper condition rather than a way to defeat the switch. Accordingly, it can be seen that the ability to detect these different events via different voltages that are presented to the ADC input can help make the cable 100 harder to defeat. The detected condition will serve as the lanyard sensor status, and this status can then be reported by the microcontroller 500 to a remote computer system. The capacitor, Zener diode, and resistor 608 that are shown in FIG. 6 can be included to provide protection for the microcontroller 500 at the ADC input with respect to DC voltages, ESD, and RF susceptibility/immunity.

While the example circuits of FIGS. 5 and 6 are shown for an example cable 100 used to charge an electronic stylus 400, it should be understood that similar circuit designs can be used to intelligently charge and detect customer interactions with other types of electronic devices. For example, a practitioner might find that some circuit components are not needed for certain types of electronic devices. As an example, the separate lanyard cable sense loop might not be needed if the electronic device is a smart phone or tablet computer.

Figure 7A:
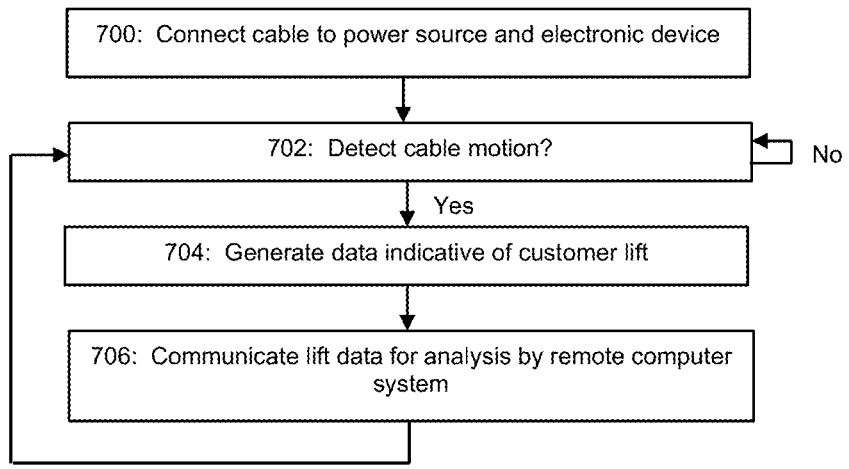
FIGS. 7A and 7B show example process flows for tracking customer interaction data based on motion of the motion sensing cable.
Figure 7B:
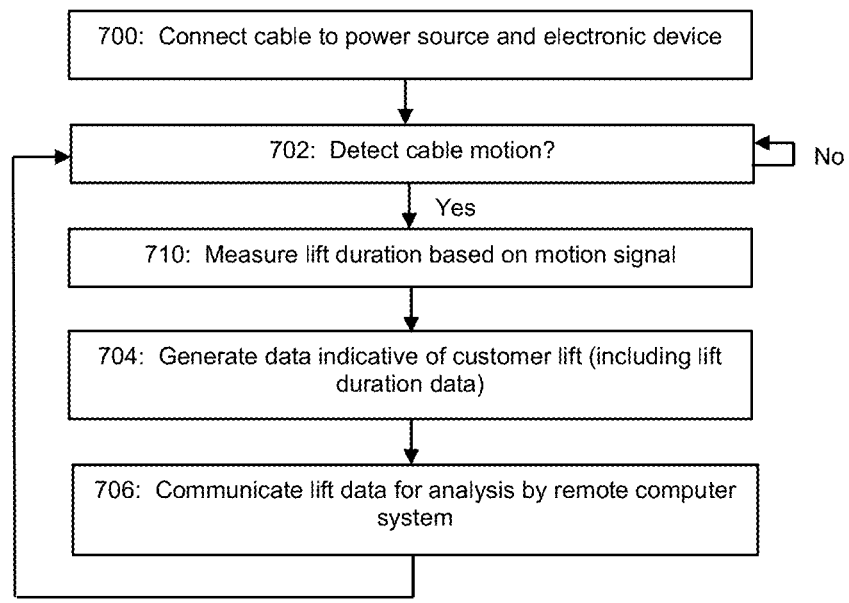

As noted above, another function that can be implemented by cable 100 is detecting and reporting customer interaction with the connected electronic device 200. FIGS. 7A and 7B show example process flows for tracking customer interaction data based on motion of the motion sensing cable 100. In some embodiments, these process flows can be implemented in concert with intelligent charge control as described above in connection with FIGS. 3A-3D. However, in other embodiments, these process flows can be implemented in a cable 100 that does not provide intelligent charge control.

With reference to FIG. 7A, at step 700, the cable 100 is connected to the electronic device 200 and power source 202. At step 702, the circuit 114 checks for motion by evaluating whether the motion signal 118 indicates a lift of the electronic device 200 by a customer. If so, the process flow proceeds to step 704. At step 704, the circuit 114 generates data indicative of a customer lift. This data can be a simple data flag indicating that a lift has occurred. Or it can be a more complex data structure that includes additional information such as a time stamp for the detected lift or other information. At step 706, the circuit 114 communicates the lift data to a remote computer system for analysis thereby. The circuit 114 can perform this communication by reporting the lift data back to a base station through which the cable 100 connects with power source 202. The base station can then relay this lift data to a remote server using wireless communication. Examples of techniques for wireless communication in this context are described in U.S. Pat App Pubs. 2017/0164314, 2018/0288720, 2018/0288721, and 2018/0288722, the entire disclosures of each of which are incorporated herein by reference.

FIG. 7B shows an example process flow where the lift data includes data indicative of a time duration for the customer interaction with the electronic device 200. The process flow of FIG. 7B includes step 710, where the circuit 114 measures the lift duration based on the motion signal 118. For example, with reference to FIG. 3D, the lift duration can be the amount of time that the cable 100 spends in the Lift state for each lift event (or the time spent in the Lift state and Wait state for each lift event). This measured duration can then be included as part of the lift data that is generated and sent at steps 704 and 706.

The circuit 114 can be configured to send the lift data in real-time each time new lift data is generated. However, in another example embodiment, the circuit 114 can include a memory for storing lift data, and the lift data can be aggregated over time and sent out to the remote computer system in batches if desired (e.g., an hourly or daily report of lift data).

Thus, by including the lift tracking capabilities in the cable 100 itself, retailers and merchandisers are provided with a sleeker option for presenting electronic devices to customers while still maintaining an ability to track customer interactions via lift detection. This stands in contrast to prior approaches of where the lifting tracking was built into larger hardware devices such as puck and base assemblies, as shown in U.S. Pat. No. 8,698,617.

While the invention has been described above in relation to its example embodiments, various modifications may be made thereto that still fall within the invention's scope. Such modifications to the invention will be recognizable upon review of the teachings herein.

What is claimed is:

1. A system comprising:
   a hub that is connectable to a power source;
   a flexible conductive cable that is connectable to the hub, the flexible conductive cable having a first longitudinal end and a second longitudinal end opposite the first longitudinal end, wherein the flexible conductive cable comprises:
   a first connector located at the first longitudinal end, wherein the first connector is connectable to an electronic device;
   a second connector located at the second longitudinal end, wherein the second connector is connectable to the power source via the hub;
   a motion sensor; and
   a circuit configured to (1) generate data indicative of customer interaction with the electronic device based on a motion signal from the motion sensor, and (2) communicate the generated data to the hub.

2. The apparatus of claim 1 wherein the hub is further configured to communicate the generated customer interaction data to a remote computer system.

3. The apparatus of claim 1 wherein the circuit is further configured to compare the motion signal with a plurality of conditions to determine whether the motion signal is indicative of customer interaction with the electronic device.

4. The apparatus of claim 1 wherein the customer interaction corresponds to a lift of the electronic device.

5. The apparatus of claim 1 wherein the circuit is further configured to measure a duration for the customer interaction based on the motion signal, and wherein the generated data includes the measured duration.

6. The apparatus of claim 1 wherein the circuit includes a processor, the processor configured to generate the customer interaction data.

7. The apparatus of claim 6 wherein the circuit further comprises a memory, and wherein the processor is further configured to store the customer interaction data in the memory.

8. The apparatus of claim 1 wherein the electronic device is an electronic stylus, and wherein the first connector is adapted for connection with at least one of (1) a complementary connector on an adaptor for the electronic stylus, and/or (2) a complementary connector on the electronic stylus.

9. The apparatus of claim 1 wherein the electronic device is a wearable device, and wherein the first connector is adapted for connection with at least one of (1) a complementary connector on an adaptor for the wearable device, and/or (2) a complementary connector on the wearable device.

10. The apparatus of claim 9 wherein the wearable device comprises a smart watch.

11. The apparatus of claim 1 wherein the electronic device is a digital camera, and wherein the first connector is adapted for connection with at least one of (1) a complementary connector on an adaptor for the digital camera, and/or (2) a complementary connector on the digital camera.

12. The apparatus of claim 1 wherein the electronic device is a virtual reality device, and wherein the first connector is adapted for connection with at least one of (1) a complementary connector on an adaptor for the virtual reality device, and/or (2) a complementary connector on the virtual reality device.

13. The apparatus of claim 1 wherein the electronic device is a smart phone, and wherein the first connector is adapted for connection with at least one of (1) a complementary connector on an adaptor for the smart phone, and/or (2) a complementary connector on the smart phone.

14. The apparatus of claim 1 wherein the electronic device is a tablet computer, and wherein the first connector is adapted for connection with at least one of (1) a complementary connector on an adaptor for the tablet computer, and/or (2) a complementary connector on the tablet computer.

15. The apparatus of claim 1 wherein the flexible conductive cable further comprises a housing, wherein the first connector and the circuit are resident in the housing.

* * * * *